UNITED STATES PATENT OFFICE.

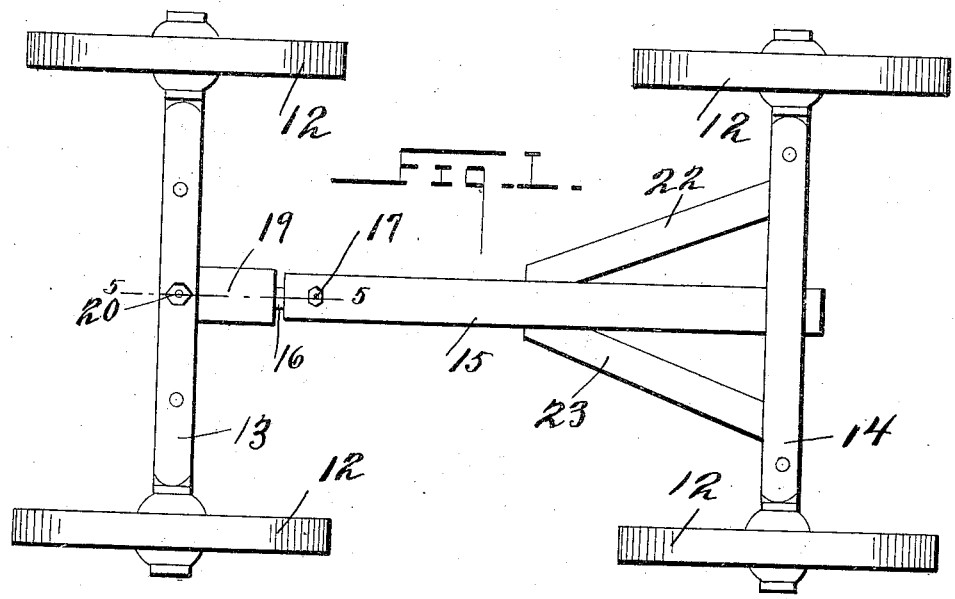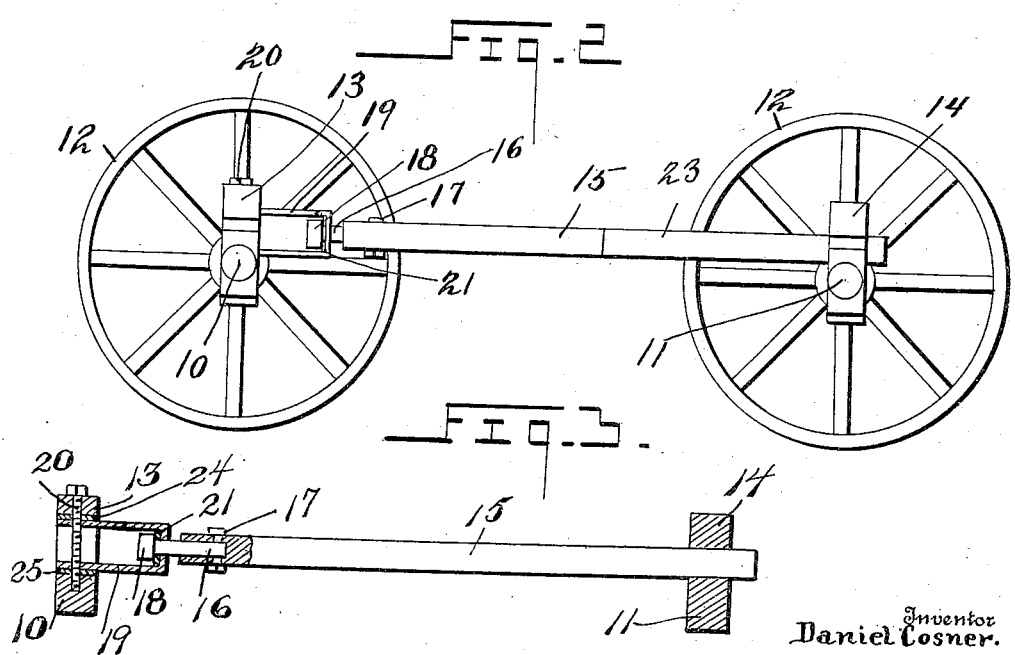

DANIEL COSNER, OF LENORE, IDAHO.

WAGON-REACH.

965,990.     Specification of Letters Patent.     Patented Aug. 2, 1910.

Application filed September 16, 1908. Serial No. 453,330.

*To all whom it may concern:*

Be it known that I, DANIEL COSNER, a citizen of the United States, residing at Lenore, in the county of Nez Perce and State of Idaho, have invented certain new and useful Improvements in Wagon-Reaches, of which the following is a specification.

This invention relates to wagons and has special reference to a reach employed in the underframe of the wagon.

An object of this invention is to construct a wagon reach in such a manner that the axle will yield rotatably about the reach upon an uneven road.

The invention has as a further object a reach of this nature which can be made strong and durable so as to withstand the ordinary usage of a reach without having the liability of twisting which is the cause of the breakage of devices of this character.

A still further object of this invention is the manner in which the forward end of the reach is secured to the axle to admit of sharp turns of the wagon without straining any of the parts of the frame.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a top plan view of a wagon frame having the improvement applied thereto, Fig. 2 is a side elevation of the same, Fig. 3 is a longitudinal vertical cross section of Fig. 1.

Referring now to the drawings, 10 and 11 designate the front and rear axles respectively of the under frame of a wagon which are provided with carrying wheels 12, which are rotatably mounted thereon, said axles being rigidly secured to the bolsters 13 and 14, so that said axles and bolsters may be properly recessed for receiving the reach bar as will be hereinafter more fully set forth. The axles are provided upon their upper edges with the bolsters 13 and 14 positioned at the forward and rear extremities of the frame respectively and serve to support the opposite end of the reach 15. The reach 15 comprises a beam which is apertured at its forward end to receive a coupling pin 16 which is adapted to be inserted into the end aperture or socket and to be held in such position by a bolt 17 which is passed through the reach 15 and into the shank of the coupling pin 16. The pin 16 is provided with an enlarged head 18 which engages against the inner face of a U shaped shackle member 19 supported between the axle 10 and the bolster 13. The axle 10 and the bolster 13 are cut away centrally of their adjoining edges to form a recess within which is disposed the apertured extremities of the U-shaped shackle member 19 which is held in such position by a king bolt 20. The said shackle member is pivotally mounted upon the king bolt 20, which is positioned through the bolster 13 and the axle 10 and through the apertures in the shackle member, so that said member may have a pivotal movement within the recess to be more fully set forth. It will also be seen that the U-shaped shackle member 19 is so disposed within the recess formed by the cutaway portions of the bolster 13 and the axle 10, that the apertured extremities thereof will form a bearing surface for the upper and lower faces of said aperture when the vehicle is being turned in either direction and said U-shaped shackle member is also open upon its opposite sides so that ready access may be had thereto, should occasion arise to renew any of the parts thereof. The recessed portions are of such a width that the extremities of the U shaped shackle member 19 have free swinging movement to allow the axle 10 to swing at a sharp angle so as to turn the wagon in a short space. A washer 21 is disposed between the head 18 and the inner face of the U shaped member 19 to reduce the frictional contact between the two. The rear end of the reach 15 is secured through an aperture formed at the adjoining edges of the axle 11 and the bolster 14 and is braced in such position by the arms 22 and 23 which extend forwardly from the axle 11 and engage the sides of the reach 15 a short distance from the rear end thereof. For the purpose of reducing friction between the outer faces of the ends of the U shaped member 19 washers 24 and 25 are provided between the outer faces of the U shaped member 19 and the axle 10 and bolster 13. The washers 24 and 25 are brought into action as the axle 11 is swung at an angle to turn the wagon.

It is readily seen that should the wagon be traveling over a road which has an uneven surface that the axles 10 and 11 would have free play to vibrate in opposite directions without straining the reach 15. It is a well known fact that under these conditions the reaches are strained and very frequently broken and the purpose of this invention is to overcome this difficulty in the very simple manner above set forth. If it is desired to disconnect the two axles for any reason the bolt 17 is removed and the pin 16 is withdrawn from the extremity of the reach 15 disconnecting the same from the U shaped member 19 and allowing the separation of the axles 10 and 11. As shown in Figs. 2 and 3, the pin 16, is permitted a longitudinal movement so that the reach 15 is both revolubly and slidably connected to the bracket 19.

What is claimed is:—

In combination, an axle and bolster each having a centrally positioned recess, a king bolt passing through said recess, a U-shaped shackle carried upon said bolt within said recess, a pin slidably carried within the end of said U-shaped shackle, said pin having a bolt opening near its end, a wagon reach having an aperture at its forward end to receive the end of said pin, and a bolt securing said pin to said reach, the reach being permitted a slidable as well as a pivotal movement, as set forth.

In testimony whereof I affix my signature, in presence of two witnesses.

DANIEL COSNER.

Witnesses:
J. S. JONES,
N. E. WALKER.